(12) United States Patent
Ha (10) Patent No.: US 9,967,624 B2
(45) Date of Patent: May 8, 2018

(54) DIGITAL RIGHTS MANAGEMENT USING DEVICE PROXIMITY INFORMATION

(75) Inventor: Eric Ha, Sacramento, CA (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 431 days.

(21) Appl. No.: 13/410,981

(22) Filed: Mar. 2, 2012

(65) Prior Publication Data

US 2014/0041043 A1  Feb. 6, 2014

(51) Int. Cl.
*H04N 21/4627* (2011.01)
*H04N 21/45* (2011.01)

(52) U.S. Cl.
CPC ..... *H04N 21/4627* (2013.01); *H04N 21/4524* (2013.01)

(58) Field of Classification Search
CPC . G06F 21/10; G06F 21/123; G06F 2221/0706
USPC .............................. 726/26, 27, 29
See application file for complete search history.

(56) References Cited

U.S. PATENT DOCUMENTS

| 2004/0078490 | A1* | 4/2004 | Anderson et al. | 709/245 |
| 2005/0124319 | A1* | 6/2005 | Williams et al. | 455/411 |
| 2005/0125221 | A1* | 6/2005 | Brown et al. | 704/200.1 |
| 2005/0182727 | A1* | 8/2005 | Robert et al. | 705/51 |
| 2009/0049556 | A1* | 2/2009 | Vrielink et al. | 726/26 |
| 2009/0254980 | A1* | 10/2009 | Kanaparti | 726/4 |

OTHER PUBLICATIONS

NPL—Digital Right Management on an IP-based set-top box by Erik Halback, published on Dec. 19, 2005, pp. 41 and 43.*
NPL—Design Rules for Interoperable Domains by Gwenael Doerr and Tom Kalker published in Oct. 27, 2008 by ACM, p. 45.*

* cited by examiner

*Primary Examiner* — Ellen Tran
(74) *Attorney, Agent, or Firm* — Shook Hardy & Bacon L.L.P.

(57) ABSTRACT

A method and system utilizing proximity information in managing digital rights is provided. An example method includes receiving a request to access a content item at an electronic device, determining proximity information using at least one processor, the proximity information indicating proximity of the electronic device to a designated base electronic device and using the proximity information for granting or denying access to the content item.

17 Claims, 6 Drawing Sheets

DIGITAL RIGHTS MANAGEMENT USING DEVICE PROXIMITY INFORMATION

TECHNICAL FIELD

This application relates to the technical fields of software and/or hardware technology and, in one example embodiment, to system and method utilizing proximity information in managing digital rights.

BACKGROUND

A "domain" in the context of Digital Rights Management (DRM) is a group of devices that share the same rights/privileges with respect to one or more items of digital content (content items). Digital content includes, but is not limited to, video content, audio content, text data (such as, e.g., e-books), and computing applications. Traditionally, in order to manage devices associated with a DRM domain, a user would manually register each device as being included in the domain. For instance, in order to add an electronic device to a domain registered to a user, the user may need to log in to each device that is intended to be included in the domain and perform certain predetermined operations. Similarly, in order to remove a device from a domain, the device has to be manually deregistered by the user, or selectively, the domain server may forcibly de-register the device.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system utilizing proximity information in managing digital rights is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

In one example embodiment, method and system utilizing proximity information in managing digital rights takes advantage of a notion that a digital rights domain may be defined as a collection of devices located within certain predetermined physical proximity of each other. For example, when two or more compatible devices are located near each other (e.g., within the confines of a house or within a certain distance of a device designated as home or a base electronic device), the rights and restrictions to consume certain digital content may be shared across devices capable of consuming digital content.

The area within which a group of devices is considered to be part of the same digital rights domain may be termed a domain area. As a device is activated within the domain area, it is automatically added into the digital rights domain. Conversely, as a device is moved outside of the domain area, the device is removed from the digital rights domain such that it no longer shares the rights and restrictions associated with the digital rights domain. For example, a domain area may be defined, approximately, by the area of a hotel building where electronic devices share the same local area network. The hotel may have a subscription to premium digital content it makes available to all customers who have checked into the hotel. When a customer checks out of the hotel, the content is no longer available to that customer. This may be achieved by method and system that utilize proximity information in managing digital rights, as the customer's device automatically joins the hotel's digital rights domain while the device is physically located in the building, and leaves the domain when the device is carried outside of the hotel building by the customer.

For the purposes of this description, a computing system configured to provide a license for use of an item of digital content is termed a license server. A device that requests access to digital content is termed, for the purposes of this description, a client computing device (or merely a client device). When proximity information for a device is determined with respect to a certain designated device, such designated device termed, for the purposes of this description, a designated base electronic device (or merely a base device). Any network-enabled electronic device may be designated as a base device. In some embodiments, a license server may be designated as a base device, while in other embodiments a device that is neither a license server nor a requesting device may be designated as a base device. Method and system utilizing proximity information in managing digital rights may be implemented using a server-based approach to determining proximity information associated with a device, as well as a client-based approach.

In a server-based approach to determining proximity information associated with a device that is requesting access to an item of digital content, a license server receives a request, determines whether the requesting device is within the certain predetermined proximity to the base device (e.g., to the physical location of the license server), and grant the license if the proximity information satisfies the designated proximity conditions (e.g., if it was determined that the requesting device is located within the certain predetermined proximity to the base device). In a client-based approach to determining proximity information a license server provides a so-called conditional license to the requesting device. A content player hosted on the requesting device may include a content access module configured to parse the conditional license every time the client (the electronic device) attempts to access the protected digital content to determine whether or not the client has access rights based on whether the client is within the required proximity to the designated base electronic device. An example network environment, within which method and system utilizing proximity information in managing digital rights may be implemented, may be described with reference to FIG. 1.

Figure 1:
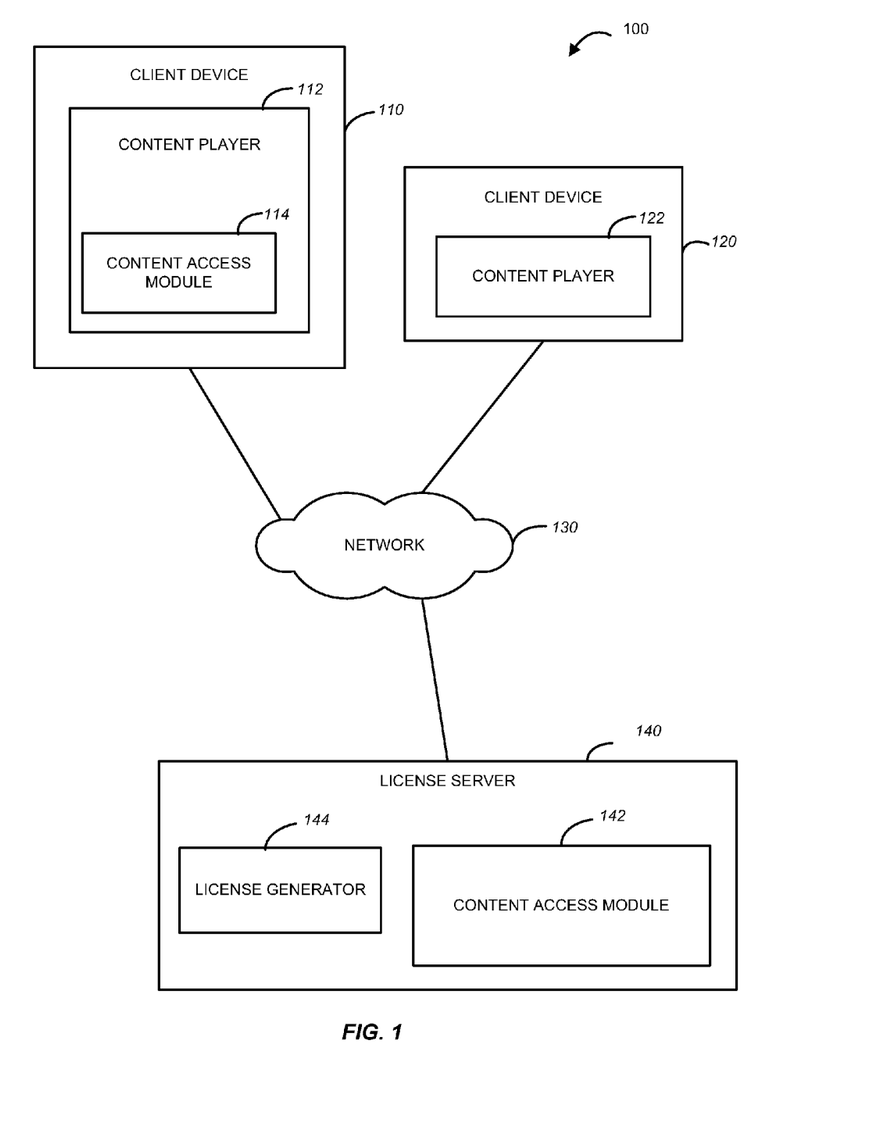
FIG. 1 is a diagrammatic representation of a network environment within which an example method and system utilizing proximity information in managing digital rights may be implemented.

As shown in FIG. 1, the network environment 100 may include client computer systems 110 and 120 having respective content players 112 and 122, and a license server computer system 140. The client systems 110 and 120 may run respective content player applications 112 and 122 and may have access to the license server 140 via a communications network 130. The communications network 130 may be a public network (e.g., the Internet, a wireless network, etc.) or a private network (e.g., a local area network (LAN), a wide area network (WAN), Intranet, etc.).

The functionality where digital rights are managed utilizing proximity information may be provided by a content access module, which may reside at a server (a content access module 142 residing at the license server 140) or, alternatively, at a client (a content access module 124 residing at the client device 110). As shown in FIG. 1, the content access module 114 may be provided with the content player 112 configured to consume the managed digital content. A license for accessing protected digital content may be generated at the license server 140 using a license generator 144. As mentioned above, in an implementation where a content access module is provided at a server, the license server 140 receives a request from a client device to access an item of digital content, determines whether the requesting device is within the certain predetermined proximity to the base device, and grants the license for the requested content only if it was determined that the requesting device is located within the certain predetermined proximity to the base device. In an implementation where a content access module is provided at a client device, the license server 140 provides a so-called conditional license to the requesting device. The content access module 114 provided with the content player 112 hosted on the client device 110 may be configured to parse the conditional license every time the client device 110 attempts to access the protected digital content in order to determine whether or not the client device 110 has access rights based on whether the client device 110 is within the required proximity to the designated base electronic device.

With reference to FIG. 1, any of the shown devices (the client device 110, the client device 120, or the license server 140) may be designated as a base electronic device. Furthermore, a content access module does not need to be provided at both the license server 140 and the client device 110. If the content access module 142 is provided at the license server 140, the method and system utilizing proximity information for managing digital rights is executed at the license server 140, where the granting or denying access to the requested content is expressed by transmitting or not transmitting a required license to the requesting device. If the content access module 114 is provided at the client device 110, the method and system utilizing proximity information for managing digital rights is executed at the client device 110. In some embodiments, the license server 140 and the client device 110 are both capable of evaluating proximity information associated with a request to access protected digital content. In this scenario, and the license server may be configured to determine whether to perform the evaluation of proximity information or to send out a conditional license to the client device 110.

A content access module provided at a server may have a different implementation from a content access module provided at a client device. An example content access module may be described with reference to FIG. 2.

Figure 2:
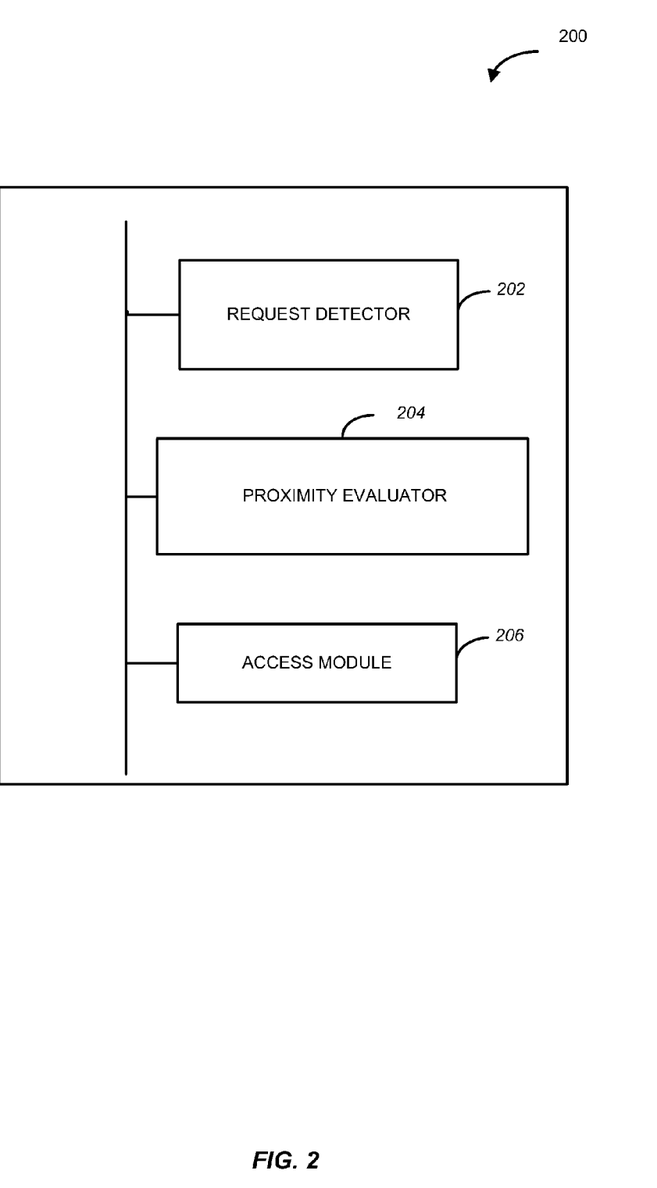
FIG. 2 is block diagram of a system to provide a method and system utilizing proximity information in managing digital rights, in accordance with one example embodiment.

FIG. 2 is a block diagram of system 200 (that also may be referred to as a content access module 200) utilizing proximity information for managing digital rights, in accordance with one example embodiment. As shown in FIG. 2, the system 200 includes a request detector 202, a proximity evaluator 204, and an access module 206. The request detector 202 may be configured to detect a request to access a content item at an electronic device (e.g., a request to access a content item using the content player 122 hosted by the client device 120 shown in FIG. 1). The proximity evaluator 204 may be configured to determine proximity information. As explained above, the proximity information indicates proximity of the electronic device to a designated base electronic device. The access module 206 may be configured to grant or deny access to the content item using the proximity information.

Some of the techniques for determining proximity information include evaluating subnet information, signal strength, connection type, sensed range information, as well as the physical distance information. The "Same Subnet" technique is a logical method of determining whether or not a client device is digitally close to a device designated as a base device. In network topology, a client device may be considered "close" if it is in the same or similar subnet, even though the client device may not be physically close to the base device. The "Signal Strength" technique is a way to roughly determine distance between two devices using the relative signal strength of the wireless connection between the two devices. A signal strength above or below a given threshold may be used as proximity information to allow or deny a device access to protected digital content. The "Connection Type" technique is a way to limit or grant a device access to protected digital content with the understanding that some wireless technologies have greater range than others. For example, Bluetooth connectivity has shorter range than 802.11b standard, which has shorter range than WiMax connectivity. Thus, if, for example, a device has a Bluetooth connection to the base device, a content access module may treat this information as proximity information indicative of the device being in close enough proximity to the base device to be considered part of the associated digital rights domain and thus eligible to access the protected content.

The "Sensed Range" technique may be utilized by first identifying respective locations of various sensor points, such as radio frequency identification (RFID) stations. If a client device is located within range of a given sensor point, or has been moved into an area that is gated on entry/exit by sensor points, the client's location can be determined as being near (or within certain distance from) the sensor point, whose relative location to the base device is known. Proximity information may thus be determined based on the location of the client device with respect to the sensor point and the location of the sensor point with respect to the base device.

In some embodiments, it may be possible to utilize a threshold distance value (e.g., "Min/Max Distance") if the exact location of the client device (within a given tolerance) can be determined. This is possible if the client device and the associated environment have adequate hardware to determine exact location. Examples of such hardware include, e.g., global positioning system (GPS), or cellular phone tower triangulation equipment, or WiFi triangulation equipment. An example method utilizing proximity information in managing digital rights can be described with reference to FIG. 3.

Figure 3:
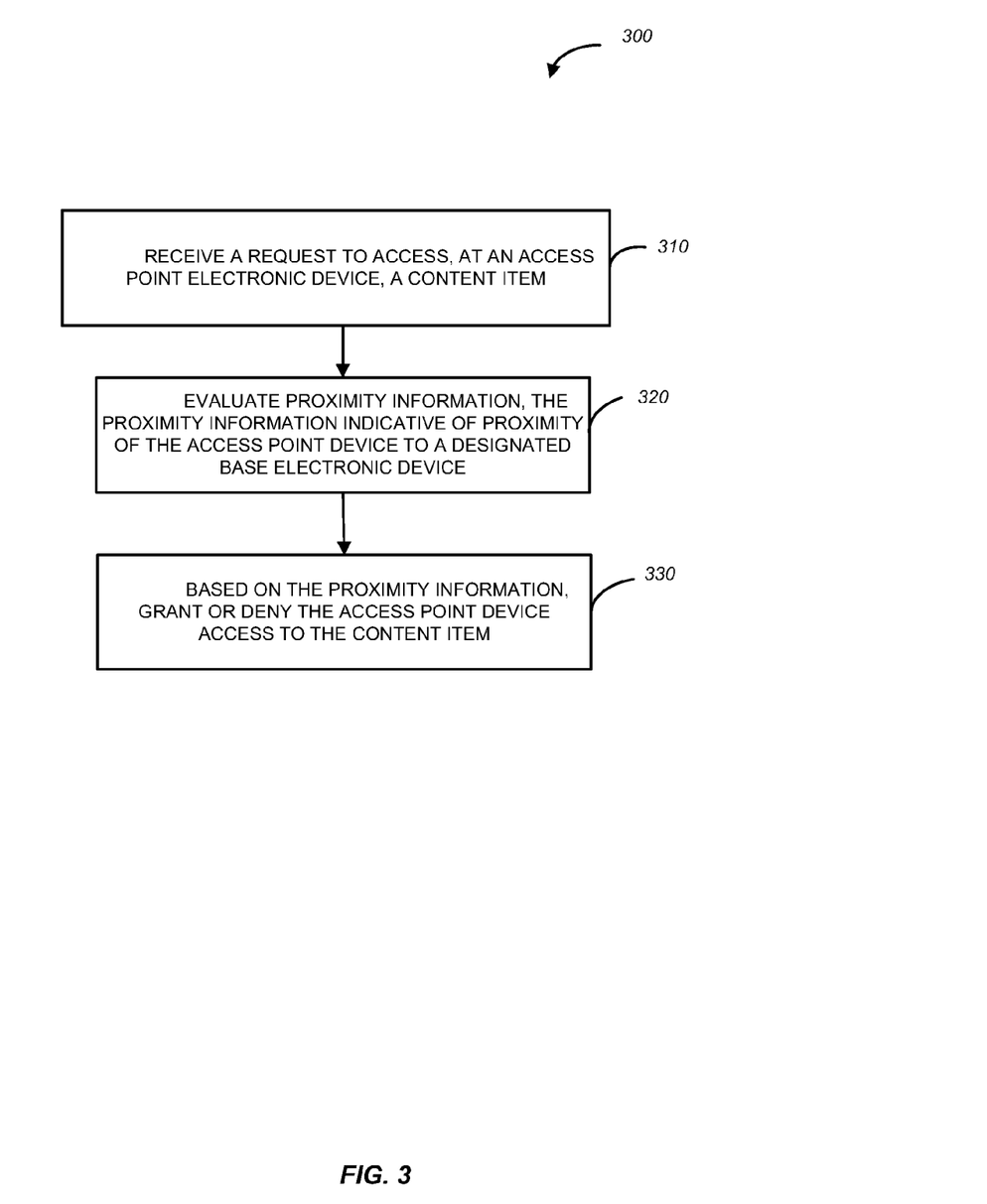
FIG. 3 is a flow chart of a method utilizing proximity information in managing digital rights, in accordance with an example embodiment.

FIG. 3 is a flow chart of method 300 utilizing proximity information in managing digital rights, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the system 200 shown in FIG. 2 (also referred to as a content access module), which may be hosted by the license server 140 of FIG. 1 or by the client device 110 of FIG. 1.

As shown in FIG. 3, the method 300 commences at operation 310, when the request detector 202 receives a request to access a content item at an electronic device. Such request may be a request to access a content item using the content player 122 hosted by the client device 120 shown in FIG. 1. At operation 320, the proximity evaluator 204 determines and evaluates proximity information. As explained above, the proximity information indicates proximity of the electronic device to a designated base electronic device. At operation 330, the access module 206 may grant or deny the device access to the content item, based on the proximity information.

Figure 4:
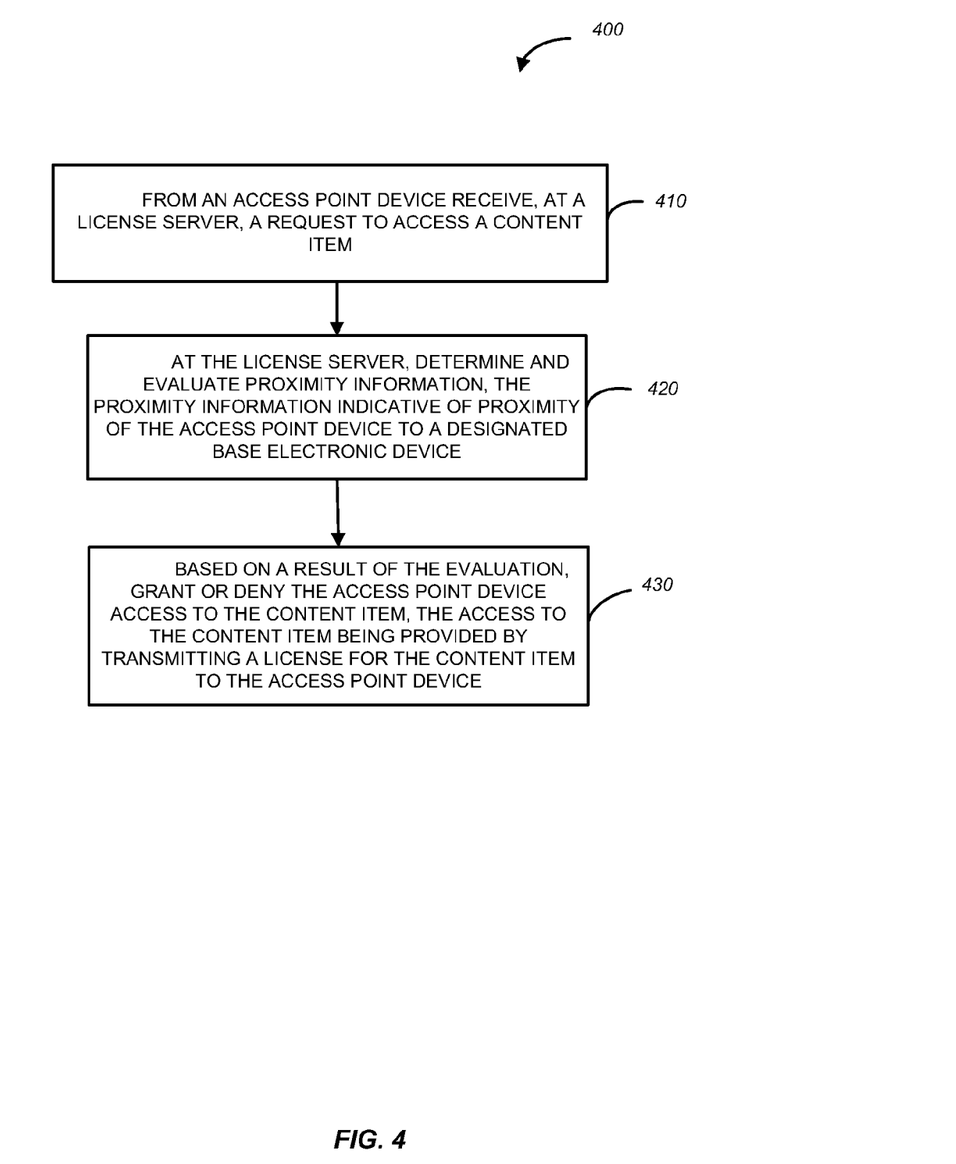
FIG. 4 is a flow chart of a method utilizing, at a license server, proximity information in managing digital rights, in accordance with an example embodiment.

As explained above, a content access module may be adapted for use at a license server, and may also be adapted for use at a client (at a device). FIG. 4 is a flow chart of a method utilizing, at a license server, proximity information in managing digital rights, in accordance with an example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the system 200 shown in FIG. 2, which may be hosted by the license server 140 of FIG. 1.

As shown in FIG. 4, the method 400 commences at operation 410, when the request detector 202, provided at a license server, receives, from a device, a request to access a content item. At operation 420, the proximity evaluator 204 determines and evaluates proximity information. At operation 430, the access module 206 may grant or deny the device access to the content item, based on the proximity information. The granting of access is indicated by transmitting, to the device, a license for the use of the requested content item. If the result of the evaluation of the proximity information indicates that the device is not within the area domain, the license for the use of the requested content item is not transmitted to the device.

Figure 5:
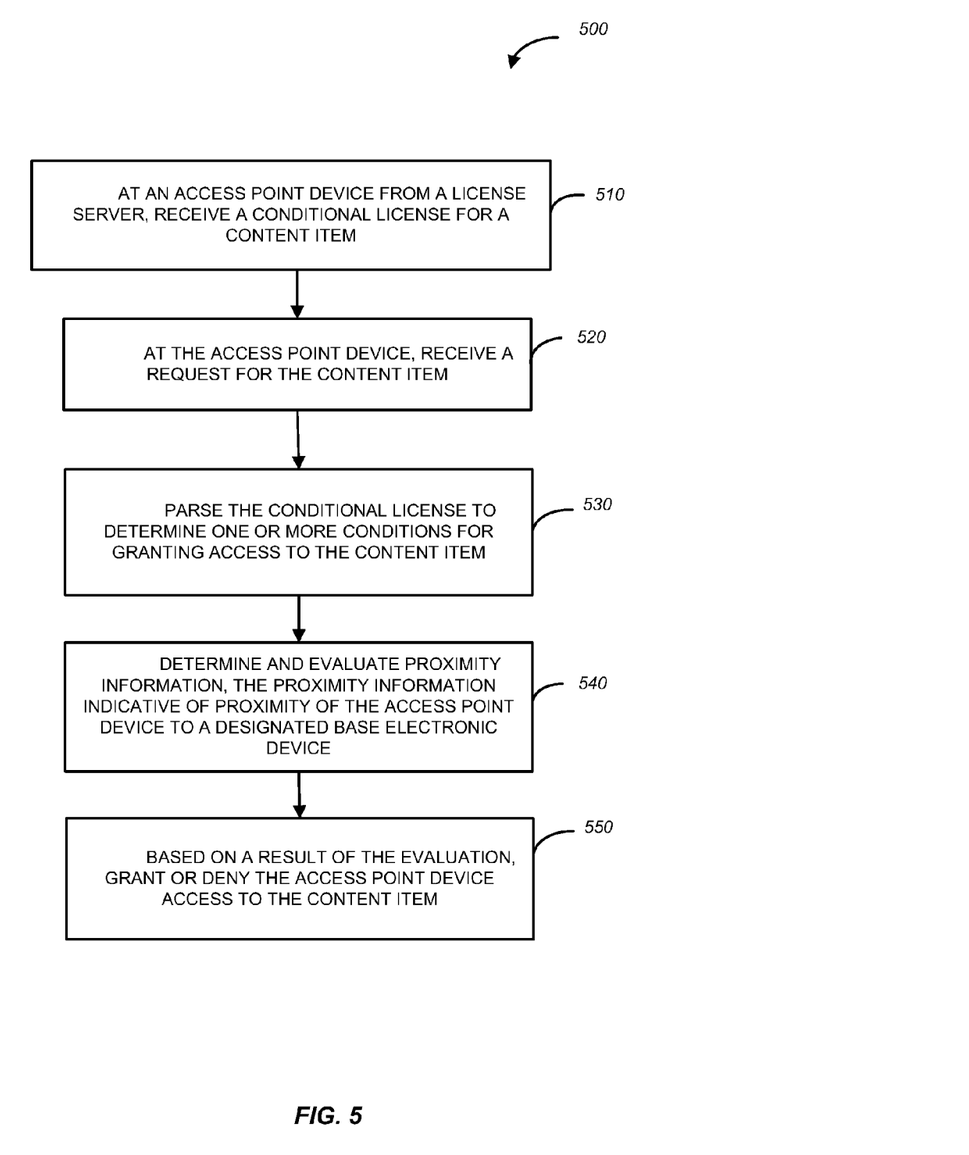
FIG. 5 is a flow chart of a method utilizing, at a device, proximity information in managing digital rights, in accordance with an example embodiment.

FIG. 5 is a flow chart of a method utilizing, at a device, proximity information in managing digital rights, in accordance with an example embodiment. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the system 200 shown in FIG. 2, which may be hosted by the client device 110 of FIG. 1.

As shown in FIG. 5, the method 500 commences at operation 510, when the device receives, from a license server, a conditional license. A conditional license may be generated at the license server and may specify the conditions that need to be satisfied in order for the proximity information to be indicative of the device being within the domain area and thus eligible to have access to the requested digital content. An example conditional license is shown in Table 1 below.

TABLE 1

```
<license>
    <Rights>
        <StartDate>"01.01.2012"</StartDate>
        <PlaybackWindowDuration>"24h"</PlaybackWindowDuration>
    // --- LICENSE EXTENSION---
    // All of the sample proximity detection methods are optional in
determining how far a client is from target "home base"
    // "Home" can be any location, not limited to where the license server
is physically located.
        <Proximity>
            <SameSubnet>true</SameSubnet>        // "digitally close",
within the same local network
            <SignalStrength>30</SignalStrength>    // "attenuation
close", as determined by signal strength of WiFi or radio transmitter of
client
            <ConnectionType>"Bluetooth"</ConnectionType> // relative
proximity can be gauged by the connection type; i.e. Bluetooth has a
specified max range
            <WithinSensorRange>true</WithinSensorRange> // can be
implemented via utilization of proximity sensors, like RFID detectors
            <MinDistance>"6 ft"</MinDistance>  // "exact measured
distance", as determined by range-finding or triangulation (e.g., GPS or
cellphone towers or WiFi access point)
            <MaxDistance>"600 ft"</MaxDistance>
        </Proximity>
    // ---END EXTENSION ---
    </Rights>
</license>
```

Returning to FIG. 5, at operation 520, the request detector 202 of FIG. 2 receives a request to access a content item at an electronic device. Such request may be a request to access a content item using the content player 112 hosted by the client device 110 shown in FIG. 1. At operation 530, the conditional license is parsed to determine one or more conditions for granting access to the requested content item. A content access module adapted for use at a device may include a parsing module (not shown in FIG. 2). In some embodiments, a parsing module is not provided with a content access module adapted for use at a license server.

At operation 540, the proximity evaluator 204 of FIG. 2 determines and evaluates proximity information. As explained above, the proximity information indicates proximity of the electronic device to a designated base electronic device. At operation 550, the access module 206 grants or denies, to the device, access to the content item, based on the results of evaluation.

Figure 6:
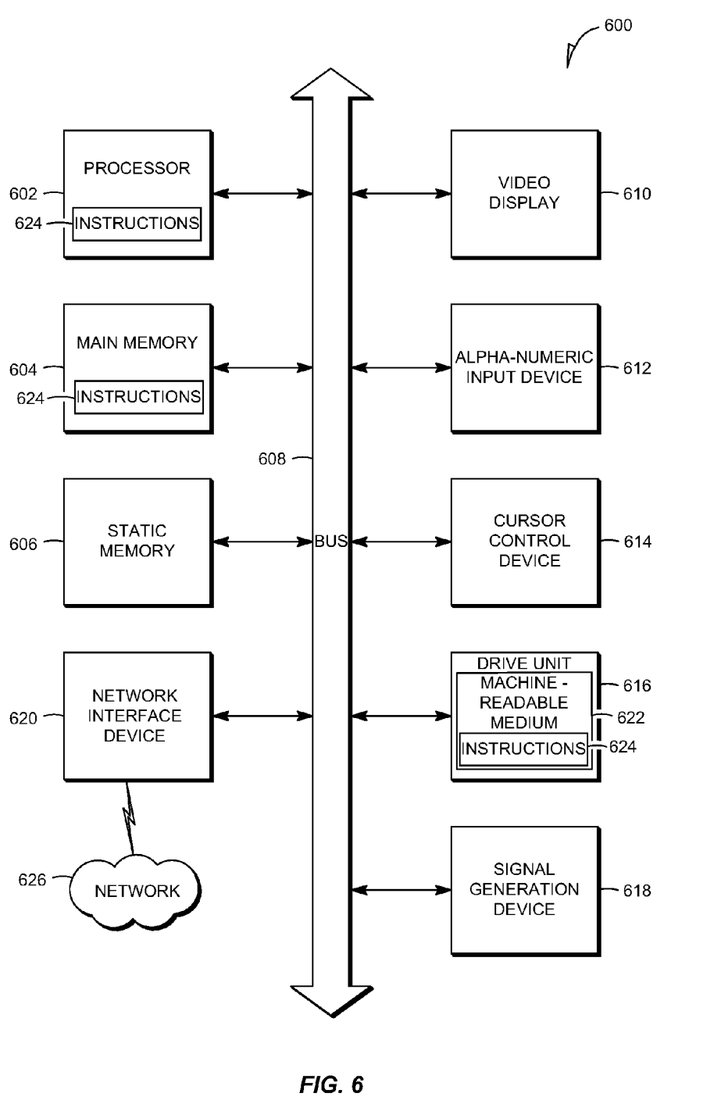
FIG. 6 is a diagrammatic representation of an example machine in the form of a computer system within which a set of instructions, for causing the machine to perform any one or more of the methodologies discussed herein, may be executed.

FIG. 6 shows a diagrammatic representation of a machine in the example form of a computer system 600 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 606. The computer system 600 may further include a video display unit 610 (e.g., a liquid crystal display (LCD) or a cathode ray tube (CRT)). The computer system 600 also includes an alpha-numeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, with the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a method and system utilizing proximity information in managing digital rights has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A computer-implemented method comprising:
providing a content access module in an electronic device of a group of electronic devices;
receiving, at the electronic device, a conditional license from a license server, the conditional license specifying that if proximity information determined by the content access module indicates that physical proximity of the electronic device to a designated base electronic device is within a domain area specified by a digital rights domain of the designated base electronic device, access to a content item by the electronic device is granted, wherein any of the group of electronic devices, if within the domain area, is considered part of the digital rights domain of the designated base electronic device;
determining the proximity information of the electronic device with respect to the designated base electronic device using the content access module;
evaluating the proximity information with respect to the conditional license;
determining that, as a result of the evaluating, the electronic device is eligible to access the content item; and
granting access to the content item based on the result of the evaluating and determining, wherein the determining the proximity information, the evaluating the proximity information, the determining access eligibility, and the granting access steps are performed by the content access module within the electronic device.

2. The method of claim 1, wherein the designated base electronic device is the license server.

3. The method of claim 1, wherein the designated base electronic device is a further electronic device.

4. The method of claim 1, wherein the determining of the proximity information comprises determining proximity by examining subnet information associated with the request.

5. The method of claim 1, wherein the determining of the proximity information comprises determining proximity by examining signal strength information associated with the request.

6. The method of claim 1, wherein the determining of the proximity information comprises determining proximity by examining connection type between the electronic device and the designated base electronic device.

7. The method of claim 1, wherein the determining of the proximity information comprises determining proximity by examining information indicative of distance between the electronic device and the designated base electronic device, the determining of the proximity information, comprising obtaining the information indicative of the distance between the electronic device and the designated base electronic device utilizing one of a global positioning system, cellular phone tower triangulation, WiFi triangulation.

8. The method of claim 1, wherein the receiving of the request is at a license server, the method comprising: at the license server, determining whether to determine and evaluate the proximity information at the license server or to transmit a conditional license to the electronic device.

9. The method of claim 1, further comprising:

automatically adding the electronic device to the digital rights domain in response to an activation of the electronic device within the domain area of the digital rights domain; and automatically removing the electronic device from the digital rights domain such that it no longer shares the rights in response to the electronic device moving outside of the domain area of the digital rights domain.

10. A computer-implemented electronic device comprising:

at least one processor coupled to a memory;

a content player;

a content access module coupled to the content player and having a request detector, a proximity evaluator, and an access module;

(1) the request detector to detect a request to access a content item to be played by the content player, the electronic device having a conditional license received from a license server the conditional license specifying that if proximity information determined by the content access module indicates that physical proximity of the electronic device to a designated base electronic device is within a domain area specified by a digital rights domain of the designated base electronic device, access to a content item by the electronic device is granted, wherein any of a group of electronic devices, if within the domain area, is considered part of the digital rights domain of the designated base electronic device;

(2) the proximity evaluator to determine proximity information of the electronic device with respect to the designated base electronic device using the content access module; and (3) the access module to grant access to the content item based on the result of evaluating the proximity information with respect to the conditional license and determining that, as a result of the evaluating, the electronic device is eligible to access the content item, wherein the proximity information is determined and evaluated, access eligibility is determined, and access is granted by the content access module within the electronic device.

11. The system of claim 10, wherein the designated base electronic device is a license server.

12. The system of claim 10, wherein the designated base electronic device is a further electronic device.

13. The system of claim 10, wherein the proximity detector is to determine the proximity information by examining subnet information associated with the request.

14. The system of claim 10, wherein the proximity detector is to determine the proximity information by examining signal strength information associated with the request.

15. The system of claim 10, wherein the proximity detector is to determine the proximity information by examining connection type between the electronic device and the designated base electronic device.

16. The system of claim 10, wherein the proximity detector is to determine the proximity information by examining information indicative of distance between the electronic device and the designated base electronic device.

17. A non-transitory machine-readable storage medium having instruction data to cause a machine to perform operations comprising:

detecting a request to access a content item at an electronic device, the electronic device being provided a conditional license;

determining proximity information using a content access module at the electronic device, the proximity information indicating physical proximity of the electronic device to a designated base electronic device that is within a digital rights domain having a domain area, wherein the domain area is an area within which a group of devices is considered to be part of the digital rights; and granting access to the content item based on the conditional license specifying that if the proximity information indicates the electronic device is within the domain area of the digital rights domain, access to the content item is granted.

* * * * *